United States Patent [19]
Kelly

[11] Patent Number: 5,864,997
[45] Date of Patent: Feb. 2, 1999

[54] JUNCTION MEMBERS AND THEIR USES

[75] Inventor: Brian Harry Kelly, Horspath, England

[73] Assignee: Brickel Designs, Oxford, England

[21] Appl. No.: 686,181

[22] Filed: Jul. 23, 1996

[51] Int. Cl.[6] ...................................................... E04B 1/38
[52] U.S. Cl. ....................... 52/282.2; 52/584.1; 52/586.1; 403/294; 403/387; 403/397; 403/405.1
[58] Field of Search ............................... 52/282.2, 584.1, 52/586.1, 586.2, 761, 780, 781, 730.1, 732.1; 256/59, 65; 403/294, 387, 397, 405.1

[56] References Cited

U.S. PATENT DOCUMENTS

| | | | |
|---|---|---|---|
| 3,186,561 | 6/1965 | Strassle | 52/282.2 X |
| 3,370,389 | 2/1968 | Macaluso | 52/282.2 X |
| 3,451,183 | 6/1969 | Lespagnol et al. | 52/282.2 X |
| 3,486,287 | 12/1969 | Guillon | 52/282.2 X |
| 3,513,606 | 5/1970 | Jones | 52/282.2 X |
| 3,848,844 | 11/1974 | Barrett | 256/59 X |
| 4,026,084 | 5/1977 | Goose | 52/780 |
| 4,101,231 | 7/1978 | Streib et al. | 52/282.2 X |
| 4,652,170 | 3/1987 | Lew | 52/182.2 X |
| 5,609,435 | 3/1997 | Normura | 52/586.2 X |

FOREIGN PATENT DOCUMENTS

| | | |
|---|---|---|
| 0460427 A1 | 12/1991 | European Pat. Off. . |
| 1290679 | 9/1972 | United Kingdom . |
| 2259924 | 3/1993 | United Kingdom . |
| WO 88/01112 A1 | 9/1988 | WIPO . |

*Primary Examiner*—Carl D. Friedman
*Assistant Examiner*—Beth A. Aubrey
*Attorney, Agent, or Firm*—M. Lukacher

[57] ABSTRACT

A junction member (1), has an external form (2) that is polygonal in cross section and has external faces (4) of a polygon; adjacent corners (3) of the polygon defining respective external adjacent corners of each external face, each of those corners constituting a respective tunnel (5) so that each corner is a respective corner box section; and an internal form (6) that is polygonal in cross section and constitutes an internal box section, each corner box section intersecting a respective corner (7) of the internal box section. The external face has one slot (8) between respective external adjacent corners, the base of the slot being comprised by a respective face (9) of the internal form, said slot being a subtantially T-shape so that a suitable tenon may be inserted into the said slot, optionally thereby permanently or releasably to interlock with the junction member.

4 Claims, 14 Drawing Sheets

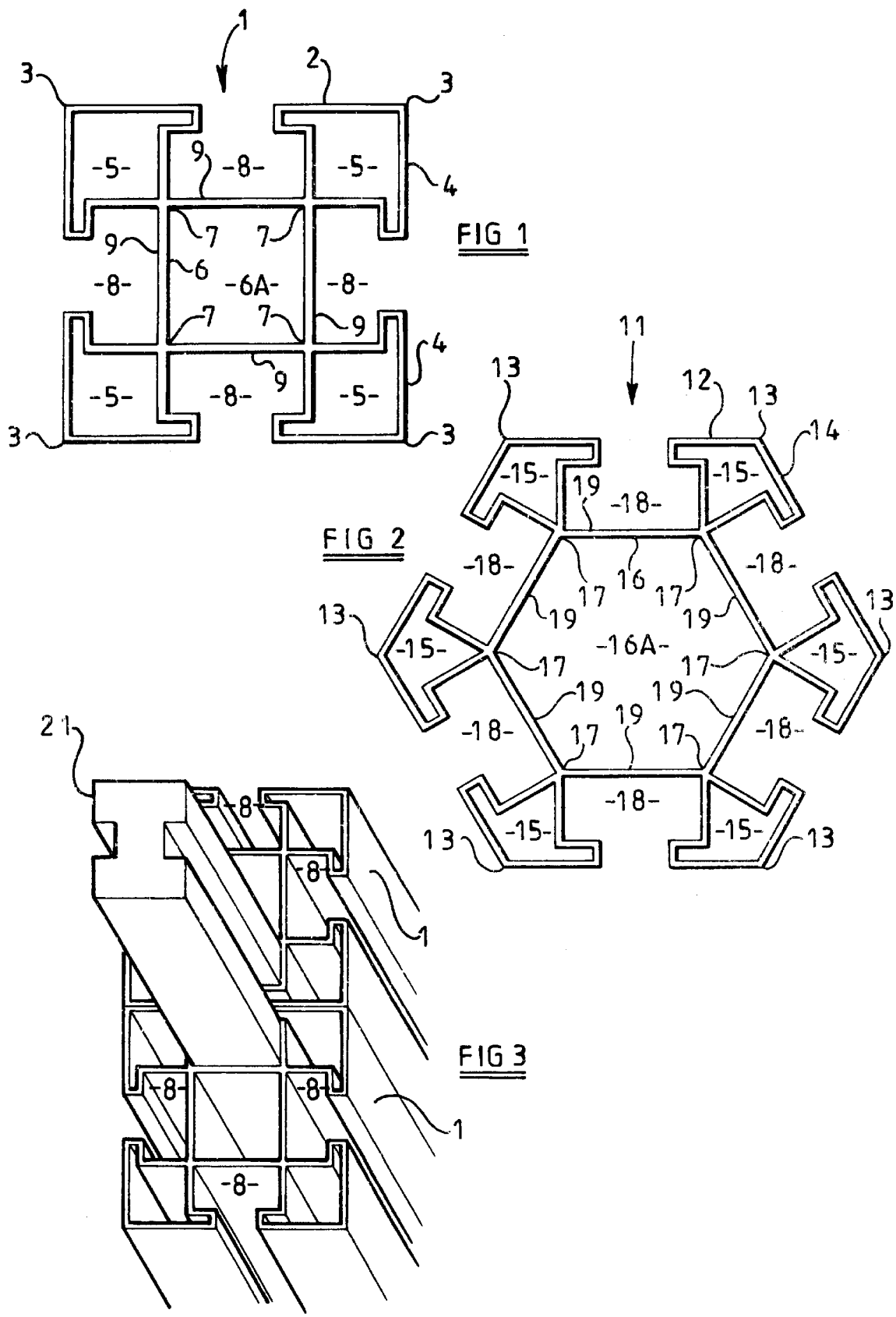

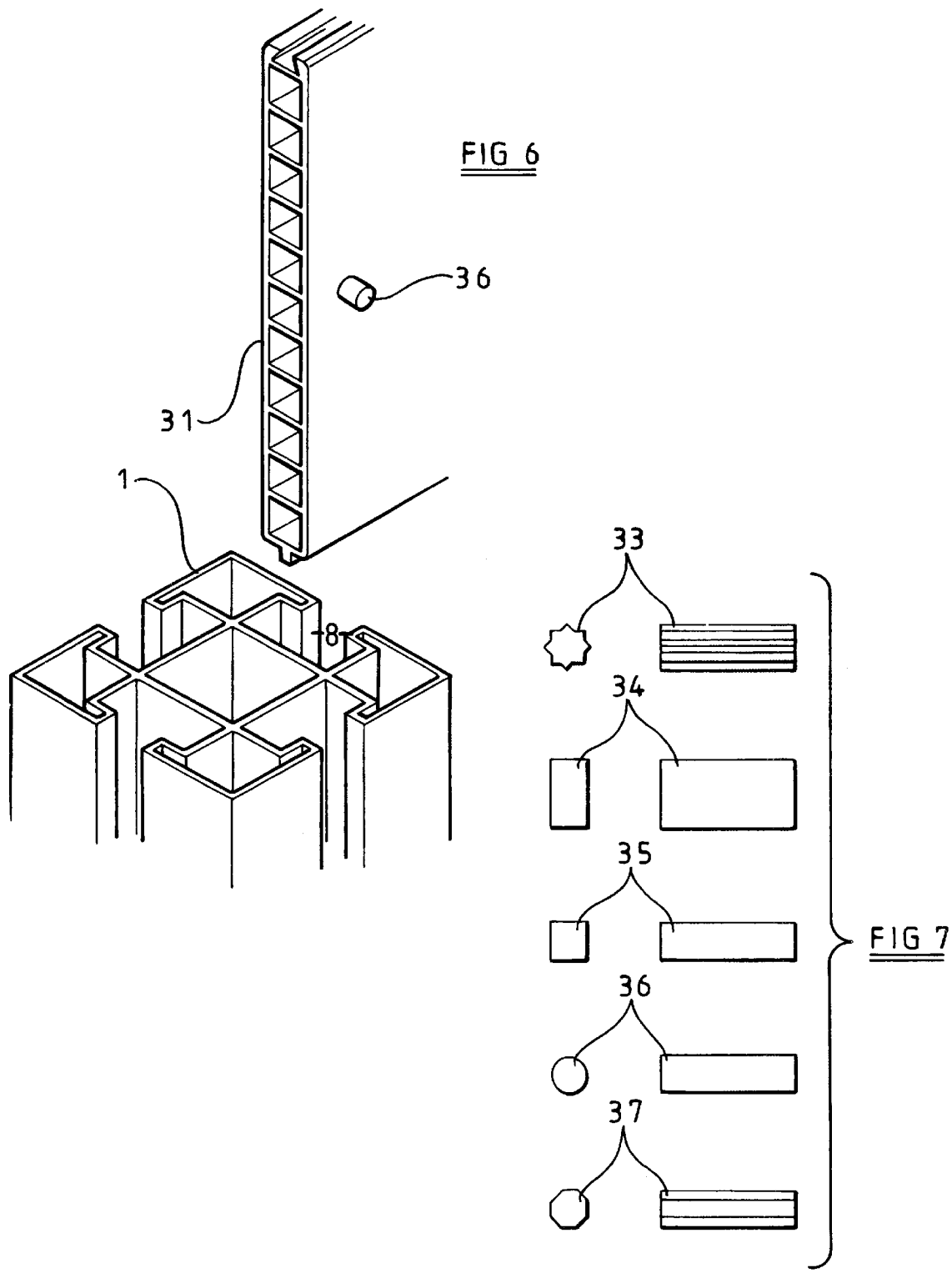

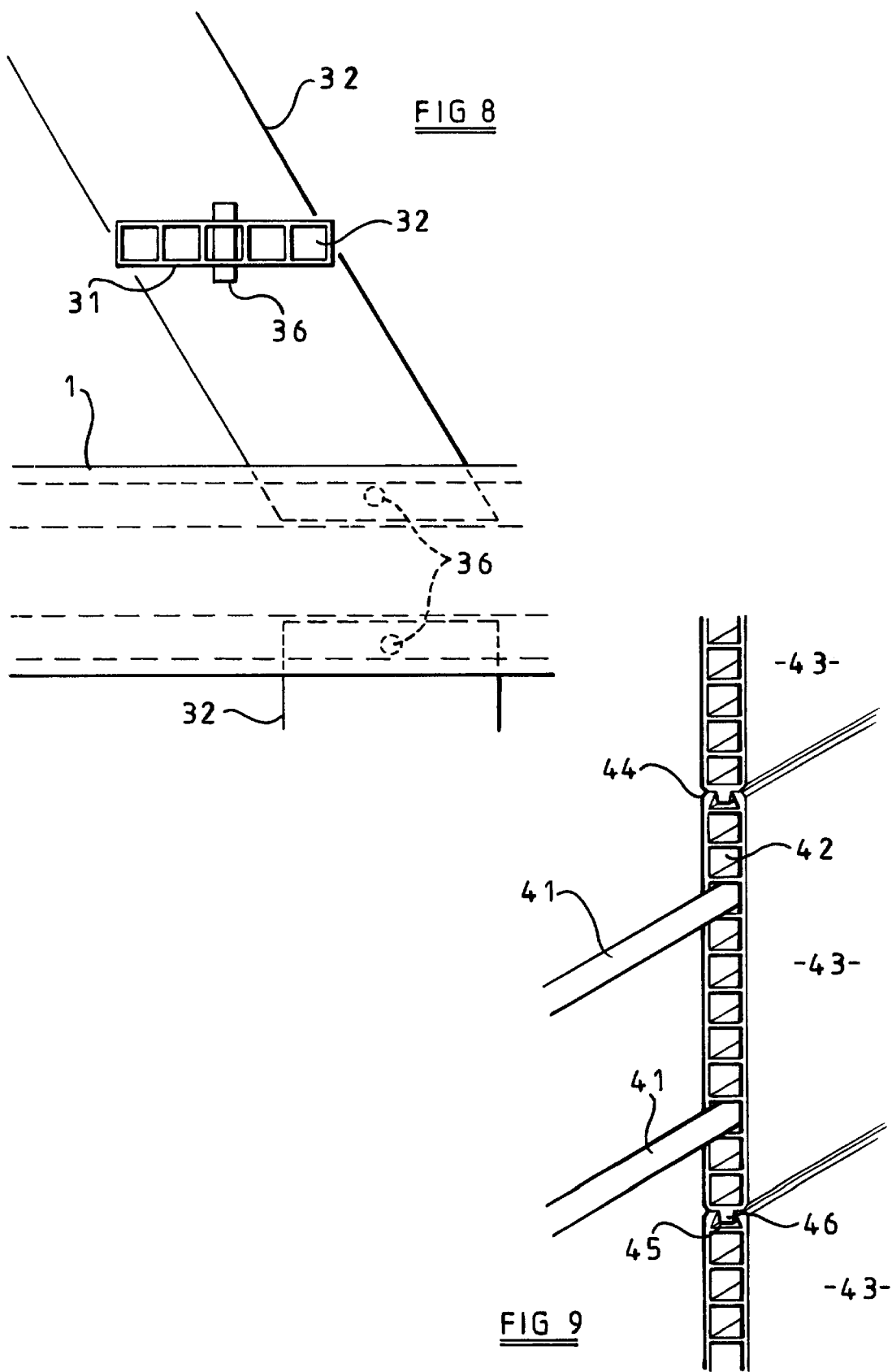

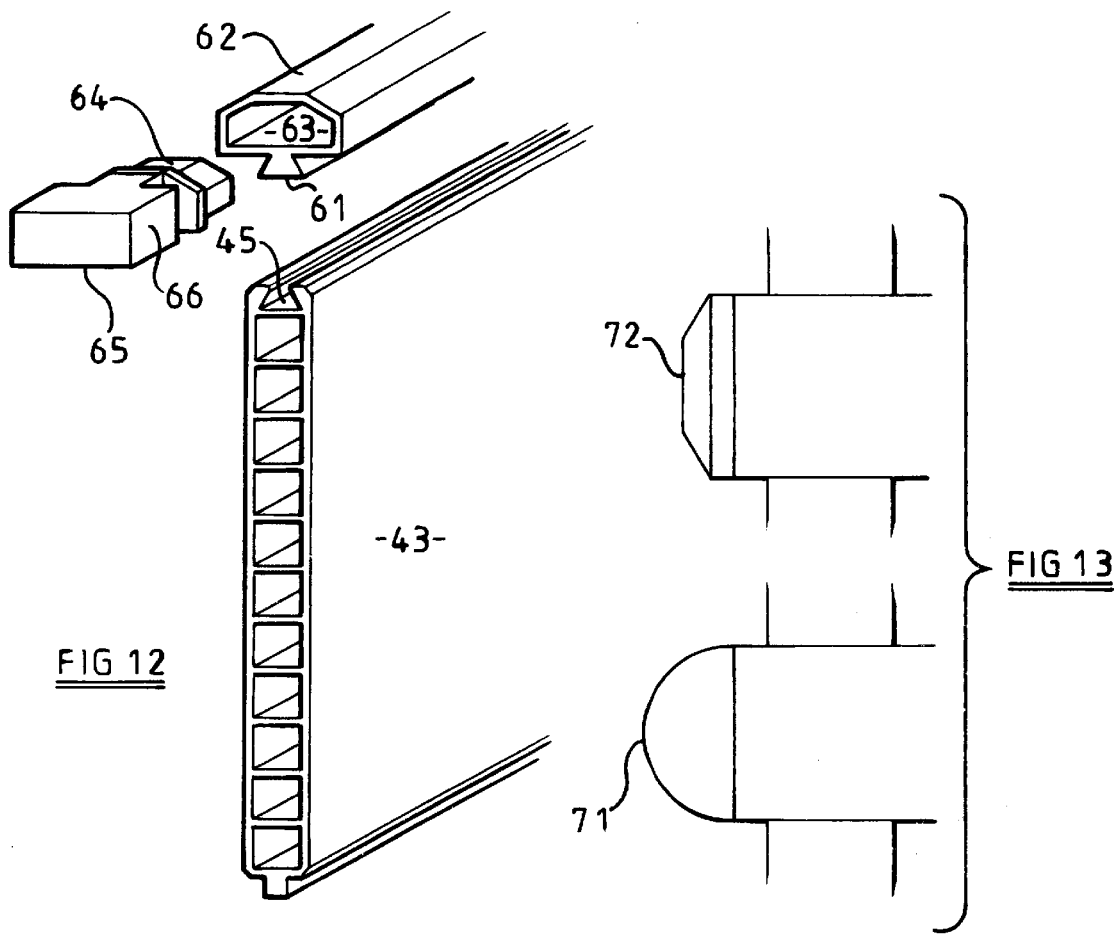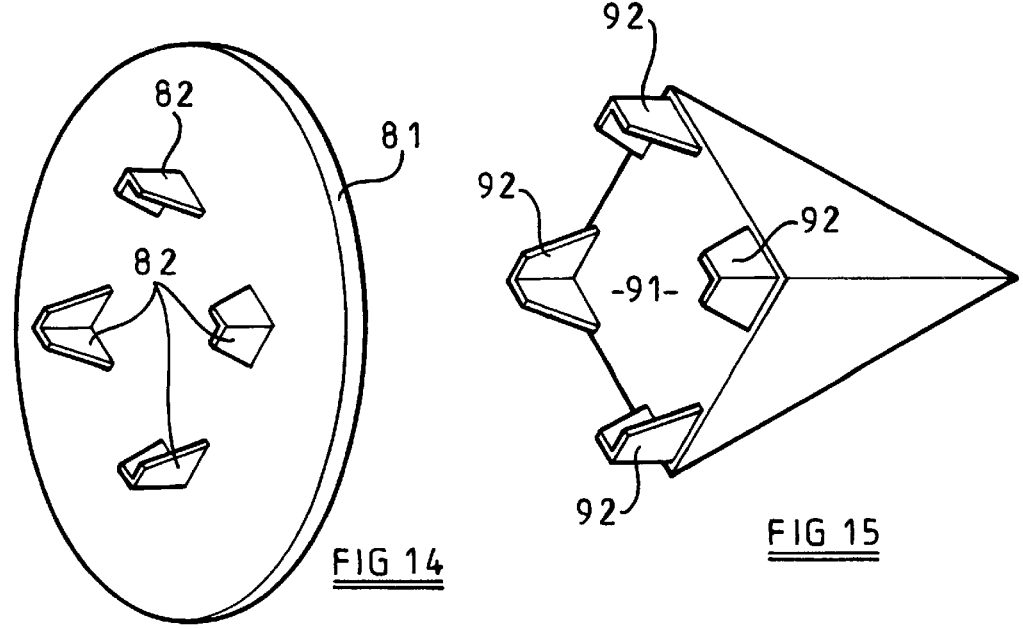

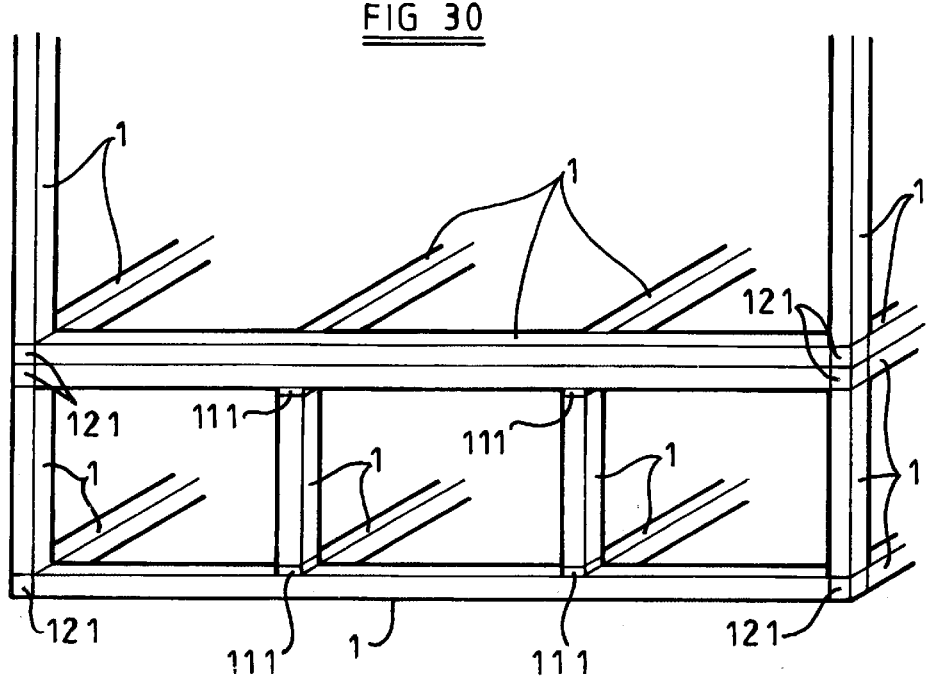
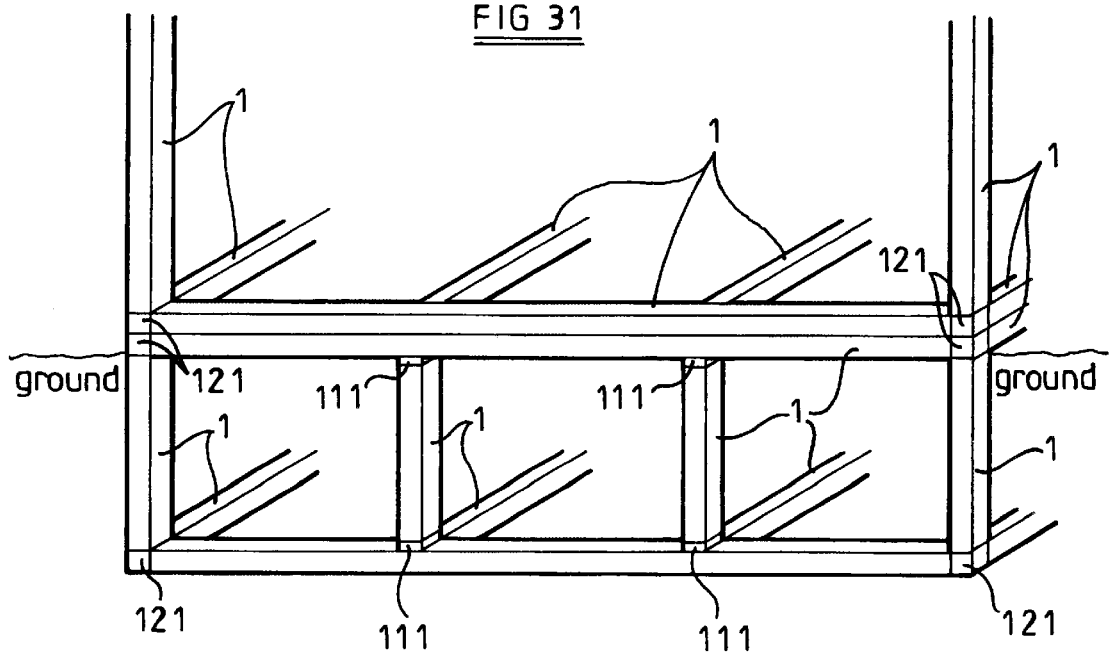

JUNCTION MEMBERS AND THEIR USES

BACKGROUND OF THE INVENTION

Structures may be assembled from structural members in various ways. For example, a first structural member comprising a mortise (i.e. a suitable socket) may receive a tenon (i.e. a projection) comprised by a second structural member, the tenon being inserted at an end transverse of the socket so as to be received by the socket and interlock together the first and second structural members. The first and second structural members may be of different kinds or the same kinds of structural members. For example, the first structural member may be a junction member (e.g. a fence post), and the second structural member may be a barrier member constituting at least a portion of a fence bay.

BRIEF SUMMARY OF THE INVENTION

It has now been found in accordance with the present invention that a novel junction member having a unique combination of external form and internal form may be utilised in assembling e.g. structures for any suitable purposes or uses, e.g. a fence or a building. Various examples of utilising a junction member of the invention are described later below and illustrated in the accompanying drawings.

Accordingly, a first aspect of the invention provides at least one junction member comprising:
an external form that is polygonal in cross section and comprises external faces of a polygon;
adjacent corners of the polygon defining respective external adjacent corners of each said external face, each of those corners constituting a respective tunnel so that each said corner is a respective corner box section; and
an internal form that is polygonal in cross section and constitutes an internal box section, each said corner box section intersecting a respective corner of said internal box section; and at least one said external face comprises at least one slot between respective said external adjacent corners, the base of the slot being comprised by a respective face of said internal form, said slot being a substantially T-shape so that at least one suitable tenon may be inserted into at least one said slot, optionally thereby permanently or releasably to interlock with said junction member.

A second aspect of the invention provides at least one coadjutant member for a junction member of the first aspect of the invention, said coadjutant member having at least one suitable tenon adapted to be inserted into at least one said box section and/or at least one said slot.

A third aspect of the invention provides at least one assembly, comprising:
at least one said junction member of the first aspect of the invention, at least two said junction being different or the same; and
at least one said coadjutant member of the second aspect of the invention, at least two said coadjutant members being different or the same.

A fourth aspect of the invention provides a structure, comprising at least one said assembly of the third aspect of the invention.

A fifth aspect of the invention provides at least one kit of parts for providing: at least one said assembly of the third aspect of the invention, or at least one said structure of the fourth aspect of the invention.

It should be noted that the expressions "substantially T-slot" and "substantially T-tenon" are respectively a suitable slot or suitable tenon, having a cross section comprising sufficient suitable property(s) of the shape of a "T", e.g. to be at least substantially a T-shape. In the present invention, at least a portion of any said tenon may be integral with, or removably coupled to, at least one other member, e.g. at least one said coadjutant member.

Said junction member of the first aspect of the present may be such said external form is tetragonal and said internal form is tetragonal. Said external form may be hexagonal and said internal form is hexagonal. Said corner box section may have at least one dimensional degree of freedom relative to said intersection. Said slot may extend at least a portion of longitudinal length of said junction member.

Said coadjutant member of the second aspect of the invention may comprise at least one suitable tenon that is a substantially T-shape for being inserted into at least one said slot according to the first aspect of the present invention.

Any component for at least one said assembly of the invention may comprise at least one said tenon. At least two said tenons may be the same or different. At least two said components may be different kinds or same kinds of components.

It will be appreciated that at least one said junction member, and/or at least one said coadjutant member, and/or at least one portion of at least one said assembly of the present invention may occupy at least one plane and be spatially disposed (e.g. downwardly, obliquely, or upwardly) in any suitable manner(s). At least one said disposition may dispose in at least one direction at least one said slot and/or at least one said tenon of the first and second aspects of the invention.

It will be appreciated that at least two like or unlike said junction members may be assembled as a cluster or nest, etc., e.g. by utilising at least one coupling member comprising at least one said tenon for optionally interlocking with at least one said slot and/or at least one said corner box section and/or at least one said internal box section. For example, at least one said coupling member may have a substantially H-shape corresponding to two said substantially T-shapes.

Said at least one assembly may be suitable for any purpose(s) or use(s). A plurality of said assemblies may be disposed in any suitable manner(s) relative to each other. For example, at least one said assembly may be disposed at least partly within (e.g. nested within) at least one other said assembly. Nested assembly(s) may provide enhanced security and/or strength. At least one said assembly may comprise at least one decorative and/or useful void. At least one said void may provide space constituting sound insulation and/or thermal insulation, etc. At least one said void may contain (e.g. as storage space) at least one utility, etc., for instance air conditioning, central heating, electricity generator(s), gas bottle(s), refrigeration, sanitation (e.g. a sewage tank), sound installation, thermal insulation. The present invention may be utilised in any suitable climates, which may be cold, hot, or temperate at at least one time. Structures (e.g. buildings) may be at least partly above, below, or on the ground. A raised building may provide enhanced flood protection. A building's foundation may be below ground level (e.g. comprising a strong frame base) for providing at least some enhanced protection against earthquake, earth tremor, or storm, etc.

All aspects of the present invention may be provided in any suitable manner(s) from any suitable material(s), from the same or different kinds of material(s). Any suitable material(s) may be used. At least one said material may be cast, and/or cut, and/or extrudable, and/or mouldable, etc. Some suitable polymeric materials may be polymeric material(s) comprising e.g. nylon(s) and/or polyethylene(s), and/or polypropylenes,, and/or polyvinylchloride(s), etc. However, material(s) other than polymeric material(s) may be utilised in accordance with the invention, e.g. suitable metal material(s), and/or wood material(s). Material(s) may have any suitable properties, e.g. appropriate to weather (for instance dryness, and/or temperature, and/or wetness). Any suitable method(s) may be used for embodying aspect(s) of the present invention.

The physical property(s) of component(s) of the present invention will be chosen according to any suitable purpose (s) or use(s) of the invention. The component(s) may have any suitable optical and/or tactile properties, e.g. colour and/or texture, and/or transparency, be at least partly suitably rigid, and/or at least partly suitably flexible, and/or at least partly suitably rigid, etc.

Some examples of said junction member(s) of invention are:

Fence Posts
Gate Posts
Coupling Posts.

Some examples of said structural member(s) of the invention are:

Barrier members (e.g. planks or rails), e.g. constituting fence bay members.
End members constituting closures (e.g. post caps)
Distance or spacing members, e.g. constituting a distance piece in said slot for e.g. at least two said tenons of two other said structural members.
Hangers, e.g. hooks.

Some purposes of said assembly(s) of the invention are:

Barriers, e.g. doors, fences, (optionally with gates etc.), partitions (for instance for display stands at exhibitions), screens, walls.
Buildings, e.g. sheds, shelters.
Enclosures, e.g. cloches, displays, greenhouses, summer houses.
Sound insulation, or reduction.
Windows.

Some users of said assembly(s) of the invention may be:

DOMESTIC MARKETS, e.g. DIY, doors, fences, gates, cloches, greenhouses, summerhouses, sheds.
GOVERNMENT DEPARTMENTS & QUANGOS, e.g. Ministry of Transport (motorways and highways, etc.) barriers.
LOCAL GOVERNMENTS.
NATIONAL RIVERS AUTHORITIES.
HEALTH AUTHORITIES, e.g. hospitals, surgeries.
EMERGENCY SERVICES e.g. fire, police, ambulance, etc.
EDUCATIONAL AUTHORITIES, e.g. schools, recreational, grounds, parks, car parks.
BUILDING CONTRACTORS, e.g. walls, conservatories, gazebos.
BUILDERS, e.g. lean to veranda's, windows.
EQUESTRIAN MARKETS, e.g. stands, stables, jumps.
AGRICULTURAL MARKETS, e.g. turnstiles, hangers, hooks.
UTILITIES SERVICES, e.g. gas, water, electricity.
BRITISH RAIL & RAIL TRACK.
EXHIBITION STANDS, e.g. display stands, screens.
STAGE—THEATRE, e.g. props.
OFFICE DIVISIONS, e.g. sound insulation or reduction.
FACTORY DIVISIONS, e.g. partitions.
STORAGE—SHELTERS, e.g. for refugees.
CHARITIES, e.g. homeless or animal pens.
STORAGE FACILITIES, e.g. packaging cases, lifting pallets.
MARITIME.
ALLOTMENTS.
TRANSPORT, e.g. trailers, trucks, vans, carts.
BRITISH AIRPORT AUTHORITIES.
SHIPPING STORAGE.
TOURIST BOARDS, e.g. holiday camps, leisure parks or leisure activities.
ARMED FORCES, e.g. Army, Royal Air Force, Royal Navy.
CONTAINERS, e.g. for storage or quick accomodation.

The invention includes equivalents and/or modifications within the scope of the disclosures of this application and/or within the scope of the accompanying drawings. The present invention may be embodied in any suitable manners. For example, at least one junction member of the first aspect of the present invention may have at least one strengthening member, e.g. a bar, rod, or tube, etc. at least partly inserted therein and optionally protruding therefrom. If desired, the protrusion may enter another junction member of the first aspect of the present invention, etc.

BRIEF DESCRIPTION OF THE DRAWINGS

In the accompanying drawings which are by way of example of the present invention:

FIG. 1 shows one example of a junction member.
FIG. 2 shows another example of a junction member.
FIG. 3 shows examples of two junction members coupled together by means of one example of a coupling member.
FIG. 6 shows utilising one example of a box section barrier.
FIG. 7 to 8 shows keys for projecting from box section barriers.
FIG. 9 shows examples of utilising box section barriers.
FIG. 12 shows an example of a box section barrier and an example of its utilisation.
FIG. 13 shows examples of caps.
FIG. 14 shows an example of a baseplate.
FIG. 15 shows an example of a spike.

FIG. 30 shows an example of a building's framework, comprising a base frame for being above or at ground level.

FIG. 31 shows an example of a building's framework, comprising a base frame below ground.

DETAILED DESCRIPTION OF THE DRAWINGS

Figure 4:
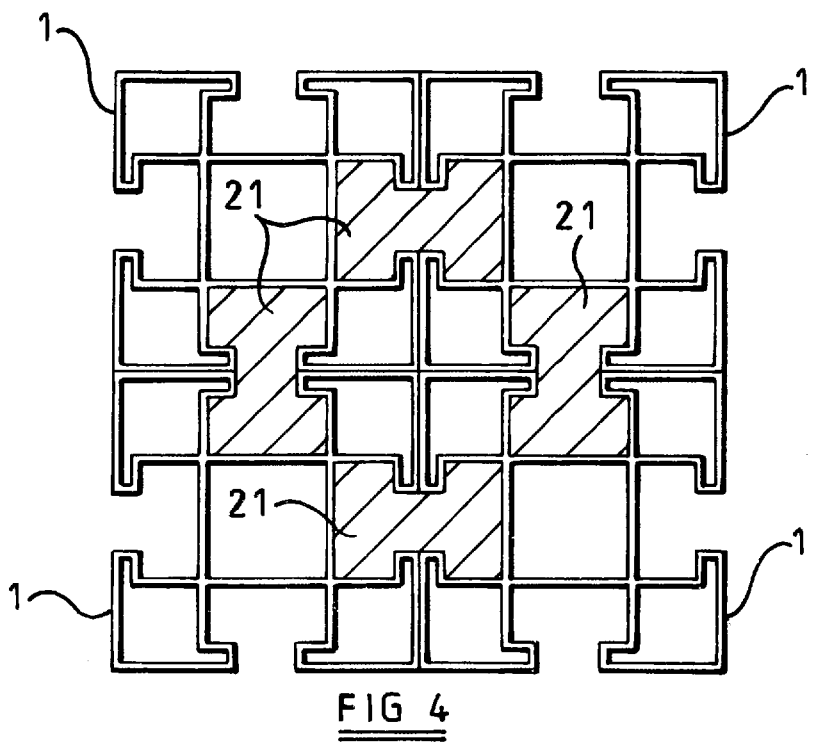
FIG. 4 shows examples of four junction members coupled together by means of examples of two coupling members.

FIG. 1 shows an example of a junction member 1 comprising:

- external form 2 that is tetragonal in cross section, adjacent corners 3 of the tetragon defining respective external corners of a face 4 of the tetragon, each of those corners comprising a respective tunnel 5 so that each corner 3 constitutes a respective corner box section; and
- an internal form 6 that is an internal box section tetragonal in cross section and having a central tunnel 6A, each said corner box section 3 intersecting a respective corner 7 of said internal box section, optionally such that at least one corner box section 3 has at least one dimensional degree of freedom (e.g. at least some flexibility and/or some resiliency) relative to that intersection; and
- wherein said external face 4 comprises a slot 8 of substantially T-shape between said adjacent external corners 3, the base of that slot being comprised by a face 9 of said internal form, slot 8 optionally extending at least a portion of the longitudinal length of junction member 1, slot 8 being shaped so that a corresponding tenon (e.g. edge portion 31, 36 cf. FIG. 6) of at least one structural member may be inserted at an end of slot 8 into that slot, and thereby permanently or releasably interlock with junction member 1.

FIG. 2 shows an example of a junction member 11 having a hexagonal external form 12 corresponding to the tetragonal external form 2 shown in FIG. 1. Junction member 11 also has an internal hexagonal form 16 having a central tunnel 16A, thereby corresponding to the internal tetragonal form 6 of FIG. 1. In FIG. 2, further items correspond to FIG. 1. Thus, adjacent corners 13 (FIG. 2) correspond to adjacent corners 3 (FIG. 1); face 14 (FIG. 2) corresponds to face 4 (FIG. 1); Tunnels 15 (FIG. 2) correspond to tunnels 5 (FIG. 1); corners 17 (FIG. 2) correspond to corners 7 (FIG. 1); slots 18 (FIG. 2) correspond to slots 8 (FIG. 1); and faces 19 (FIG. 2) correspond to faces 9 (FIG. 1). Slot 18 is shaped so that a corresponding tenon (e.g. edge portion 31, 36 of FIG. 6) of at least one structural member may be inserted at an end of slot 18 into that slot, and thereby permanently or releasably interlock with junction memebr 1.

FIG. 3 shows a cluster of two adjacent junction members 1 of FIG. 1, coupled together by means of a coupling member 21 having an H-cross section received by two T-shaped slots 8 of the two adjacent junction members 1. Coupling member 21 is inserted into the ends of the respective slots 8 so as permanently or releasably to interlock the two junction members.

FIG. 4 corresponds to FIG. 3 but shows a cluster of four adjacent junction members 1 of FIG., coupled together by two coupling members 21 each having a respective H cross-section corresponding to FIG. 3.

Figure 5:
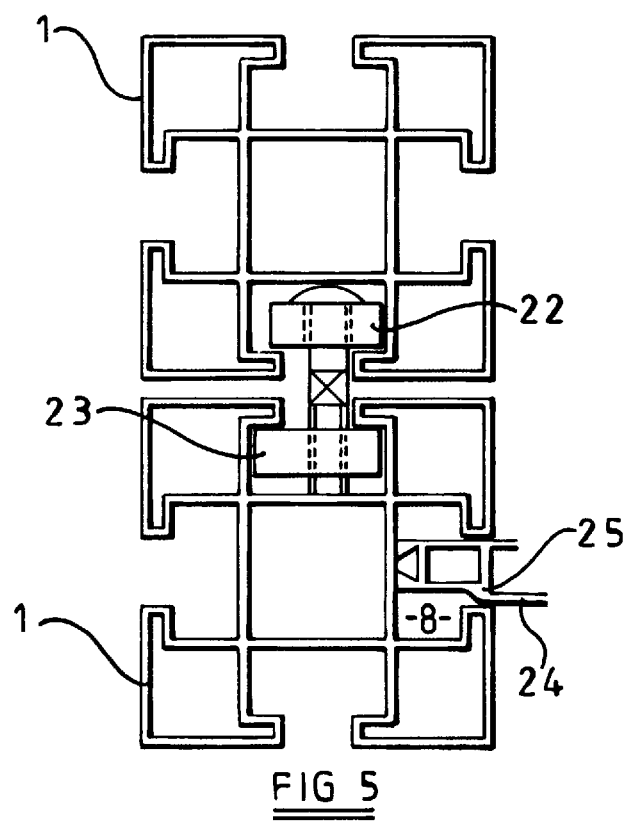
FIG. 5 shows further coupled coupling members and examples of their utilisation.

FIG. 5 corresponds to FIG. 3 but, instead of using coupling member 21 having an H cross-section, FIG. 5 replaces that member by two coupling members that are T-shaped inserts 22,23 so that the two junction members 1 shown in FIG. 5 may move relative to each other, e.g. when those members are respective portions of a door runner mechanism or of a window runner mechanism, etc. FIG. 5 also shows an edge portion 24 of a door member or window member that is received in a T-shaped slot 8 of a junction member 1. Edge portion 24 has a stepped edge 25 as shown (cf104 in FIG. 16).

FIG. 6 shows an edge portion 31 of a box-section barrier (e.g a plank or rail) 32 having a transverse key 36 projecting from opposite sides of edge portion 31 so as to constitute a T-profile tenon for entering and being received by a T-slot 8 of a junction member 1 of FIG. 1. Key 36 may be permanently or removeably comprised by edge portion 31.

FIG. 7 shows alternative keys 33 to 37 for being permanently or removably comprised by edge portion 31 (FIG. 6) instead of key 36 (FIG. 5). Keys 33 to 37 have different cross sections as shown.

FIG. 8 corresponds to FIG. 6 but shows transverse key 36 of FIG. 6 inserted through the edge portion 31 of another box—sectioned barrier (e.g. a plank or rails).

Keys 33 to 37 allow or not allow angular motion of edge portion 31 relative to any one of those keys. The angular motion may allow for uneven ground or sloping angles, etc.

FIG. 9 shows an example of reinforcing rods 41 to be inserted into the tunnels 5 of external box section corners 3 of a junction member 1 so that those rods provide reinforcement and/or strengthening, and/or rods 41 may be inserted into the box sections 42 of box-section barriers 43 (e.g. planks and/or rails). The upper edge 44 of each barrier 43 has a dovetail slot 45 for receiving a respective I-shaped tenon 46 comprised by and extending downwardly from the lower edge of a barrier 43.

Figure 10:
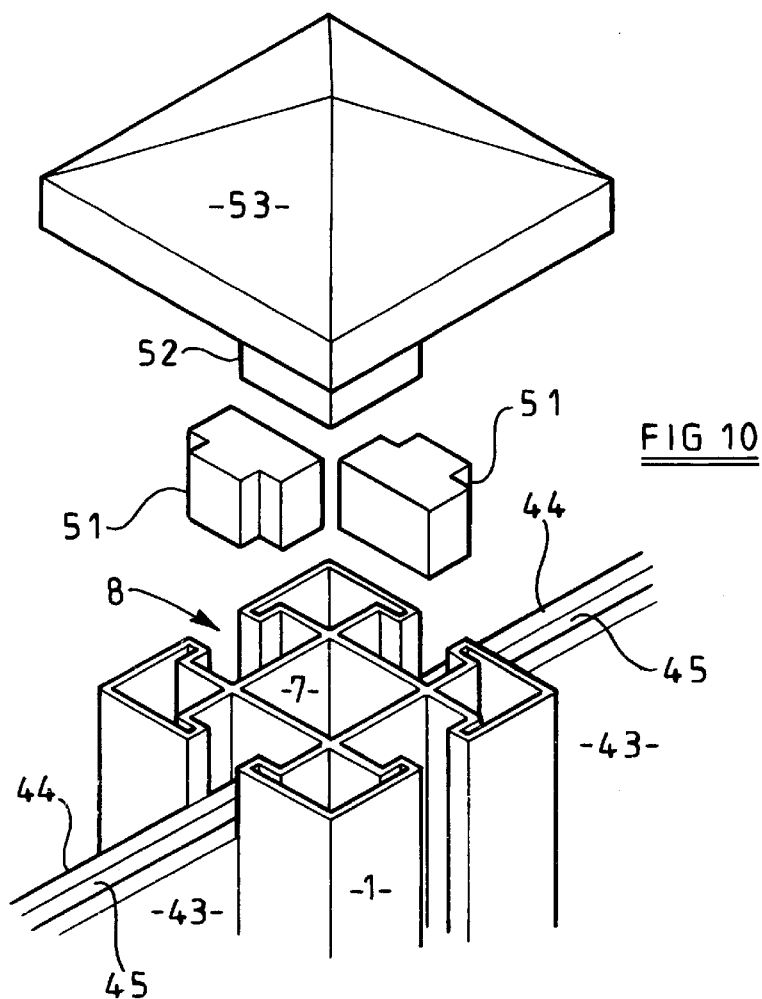
FIG. 10 shows an example of an assembly.

FIG. 10 shows a junction member (FIG. 1) having at least two box-section barriers 43 (FIG. 9) received in two opposite slots 8 of junction member 1. The other two opposite slots 8 will receive respective T-shaped inserts 51 that are spacers or distance pieces or blanking pieces. Inserts 51 allow positioning of barriers 32 or 43 (FIGS. 8,9) or other components or accessories relative to junction member 1. Central box section 7 of junction member 1 may receive a spigot 52 comprised by and extending downwardly from a cap 53. Spigot 52 will be a friction or interference fit within central box section 7, and thereby will be clamped to junction member 1. Cap 53 may have any suitable cosmetic appearance.

Figure 11:
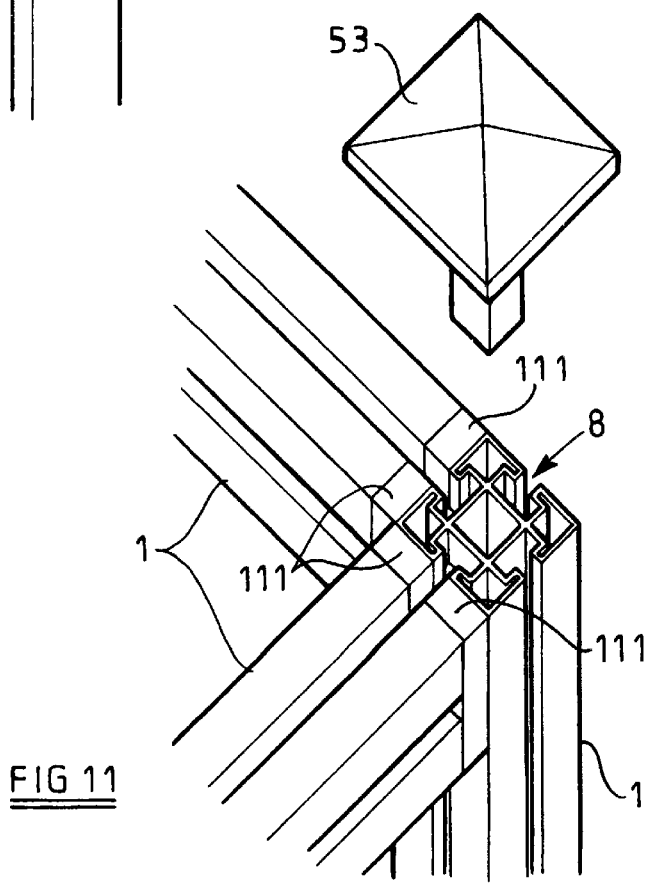
FIG. 11 shows an example of a further assembly.

FIG. 11 corresponds to FIG. 10 but shows a junction member 1 (FIG. 1) as a corner for two other junction members 1 to be at right angle to each other. T-shaped tenons (not shown) of inserts 111 are received in corresponding slots 8 of the junction members 1 so as to interlock permanently or releasably the junction members 1 together.

FIG. 12 corresponds to FIG. 9. But the dovetail slot 45 of barrier 43 receives a dovetail-shaped tenon 61 comprised by a coping member 62 having a box section 63 for receiving a corresponding spigot 64 of a coupling member 65 having a T-shaped tenon 66 for being received in a slot 8 of a junction member 1.

FIG. 13 shows alternative caps 71, 72 for replacing cap 53 of FIG. 10. Cap 71, 72 have spigots (not shown) corresponding to spigot 52 of FIG. 10.

FIG. 14 shows a baseplate or pad 81 for engaging the lower end of a junction member 1 (FIG. 1). Baseplate 71 has four upwardly directed spigots 82 for being received into respective lower ends of corner box sections 5 of junction member 1. When baseplate 1 is inverted, it could be correspondingly received by the upper ends of corner box sections 5.

FIG. 15 corresponds to FIG. 14 execpt that a spike 91 has replaced baseplate 71. Spike 91 has four spigots 93 for being received into respective lower ends (or upper ends) of corner box sections 5 of a junction member 1 (FIG. 1).

Figure 16:
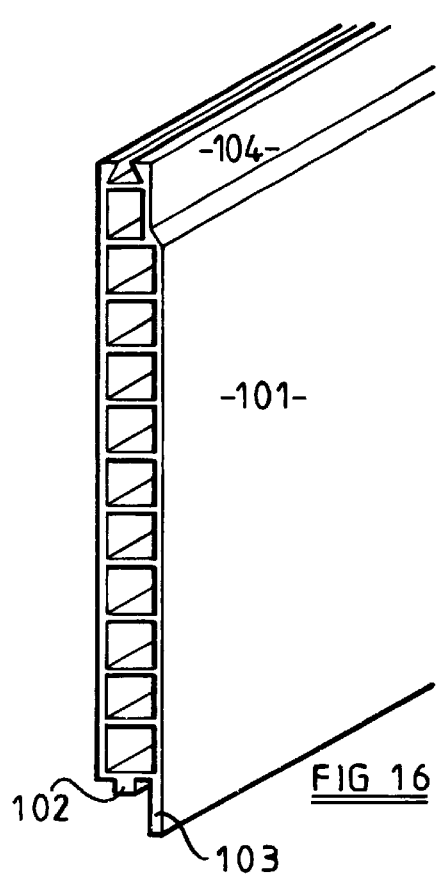
FIG. 16 shows a further example of a box section.

FIG. 16 shows a box section barrier 101 (e.g. a plank or rail) that is an alternative to a barrier member 32 or 43 of FIG. 8 and FIG. 9. Barrier 101 may receive rods 41 in the manner of FIG. 8 and FIG. 9, and/or various utility services. The lower edge of barrier 101 has an I-shaped tenon 102 similar to tenon 46 of FIG. 9, and a downward lip 103 to fit over the stepped edge 104 (corresponding to stepped edge 45 of FIG. 9) of another barrier 101 (not shown) so as to provide weather protection.

Figure 17:
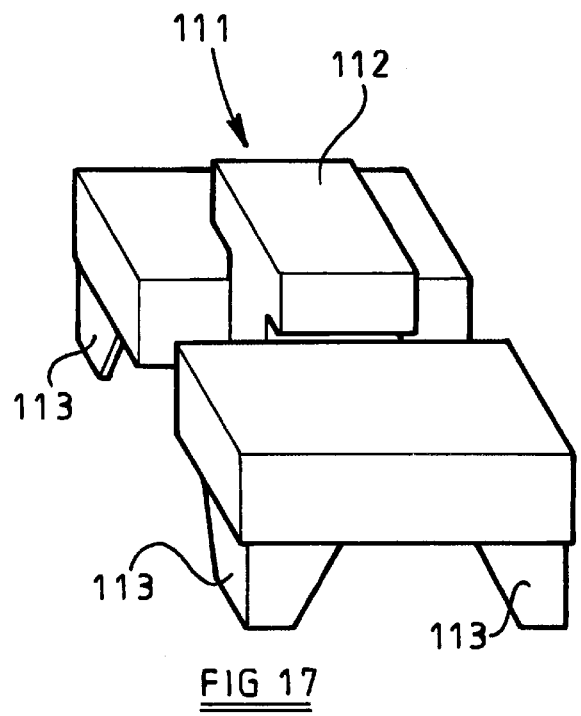
FIG. 17 shows an example of a coupling member.

FIG. 17 shows a coupling member 111 corresponding to coupling member 65 of FIG. 12. Coupling member 111 has a T-shaped tenon 112 for being receiving in a T-slot 8 of a junction member 1; and eight spigots 113 (only three are shown) for being received in corresponding corner box sections 5 of two other junction member 1 (not shown).

Figure 18:
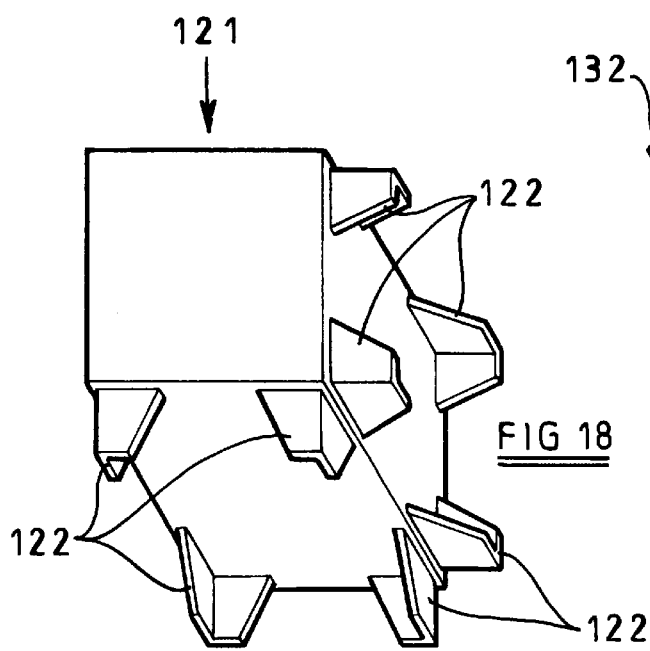
FIG. 18 shows another example of a coupling member.

FIG. 18 shows a coupling member 121 having eight spigots 122 for being received in corner box sections 5 of two junction members 1 to be at right angles.

Figure 19:
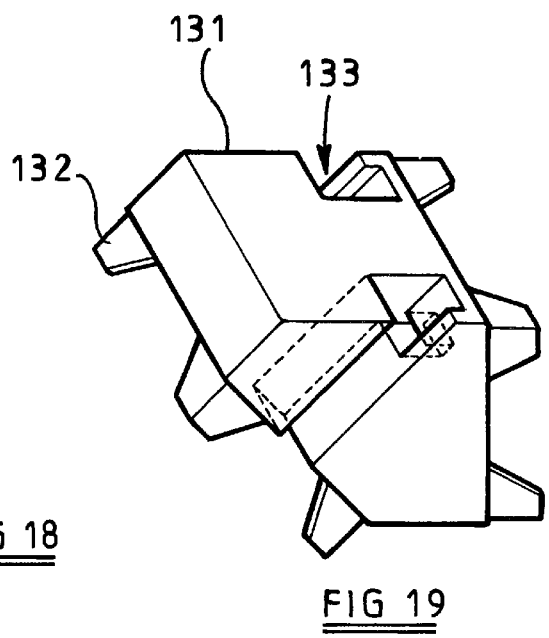
FIG. 19 shows a further example of a coupling member.

FIG. 19 shows a corner coupling member 131 having spigots 132 for being received in corner box sections 5 of junction members 1. The coupling member has a slot 133 described later below with reference to FIG. 20.

Figure 20:
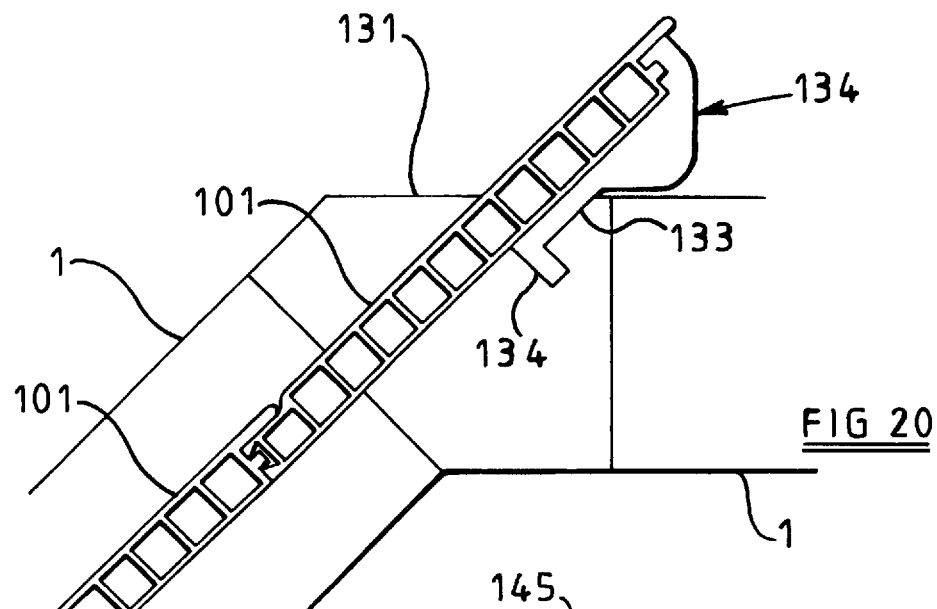
FIG. 20 shows an example of an assembly.

FIG. 20 shows two junction members 1 (FIG. 1) coupled together by a corner coupling member 131 of FIG. 12. Junction members 1 have respective box section barriers 101 of FIG. 16. Corner coupling member 131 has slot 133 (FIG. 9) for receiving and supporting a roof retaining bracket 134, thereby securing box section barriers 101.

Figure 21:
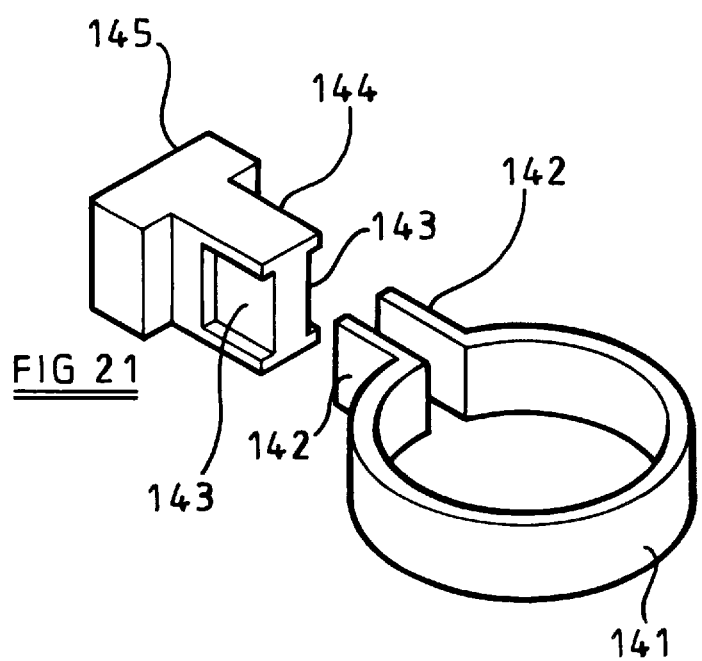
FIG. 21 shows an example of utlising a coupling member.

FIG. 21 shows a drain pipe bracket 141 having two terminal lugs 142 for being seated in corresponding recesses 143 of a coupling member 144 having a T-shaped tenon 145 for being received in a T-shaped slot 8 of a junction member 1. Tenon 145 can be located by using e.g. spacer(s) 51 of FIG. 10.

Figure 22:
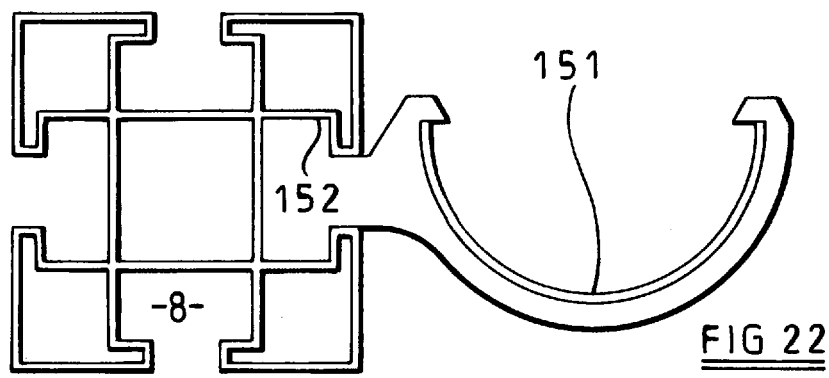
FIG. 22 shows an example of utilising a junction member.

FIG. 22 shows a gutter clip 151 having a tenon 152 for being received in a T-shaped slot 8 of a junction member 1.

Figure 23:
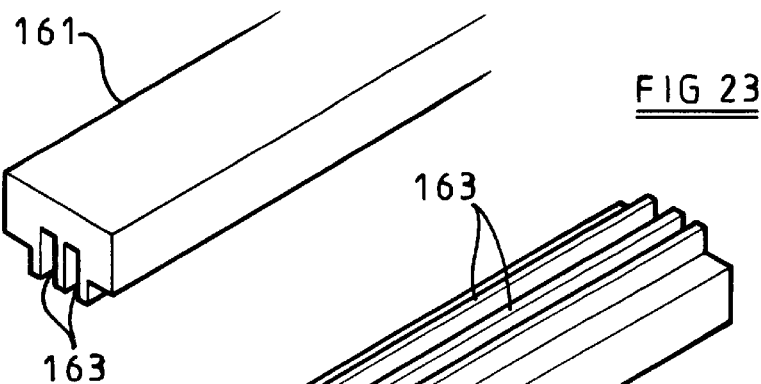
FIG. 23 shows examples of utilising two coadjutant members.

FIG. 23 shows a top window runner 161 having a T-shape for engaging a T-shaped slot of a junction member 1. FIG. 23 also shows a lower window runner 162 for engaging a T-shaped slot of a junction member 1. The runners 161, 162 have slots 163 for receiving window panes of glass or other material(s).

Figure 24:
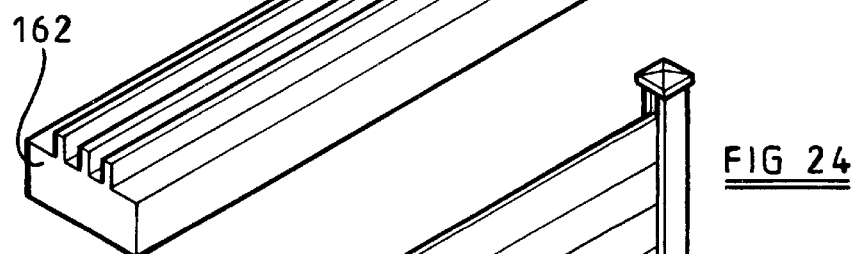
FIG. 24 shows an example of a barrier assembly.

FIG. 24 shows an example of a barrier (e.g. for a fence) comprising two junction members 1 with barriers 43 (FIG. 9) stacked in respective contact with each other.

Figure 25:
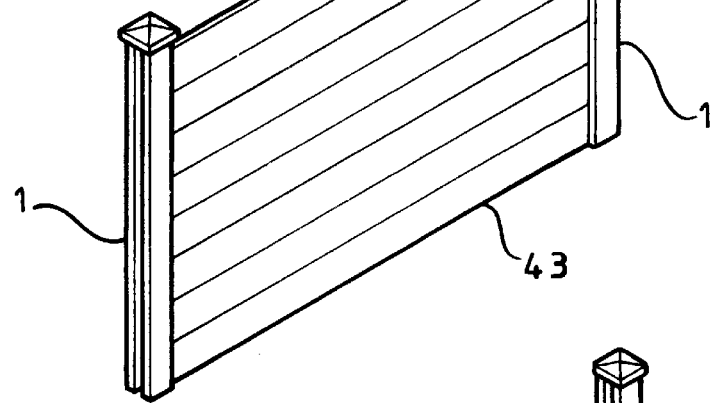
FIG. 25 shows another example of a barrier assembly.

FIG. 25 shows another example of a barrier (e.g. for a fence) comprising two junction members 1 with barriers 38 stacked in spaced apart relationship with each other.

Figure 26:
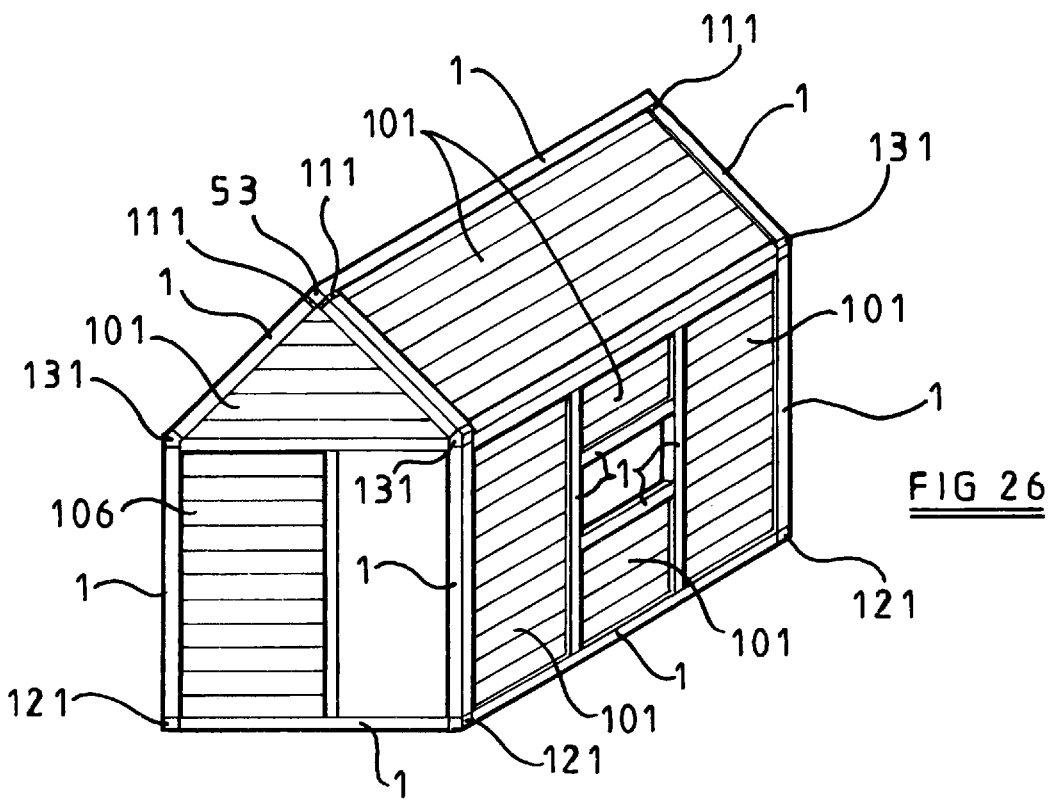
FIG. 26 shows an example of a building assembly.
Figure 27:
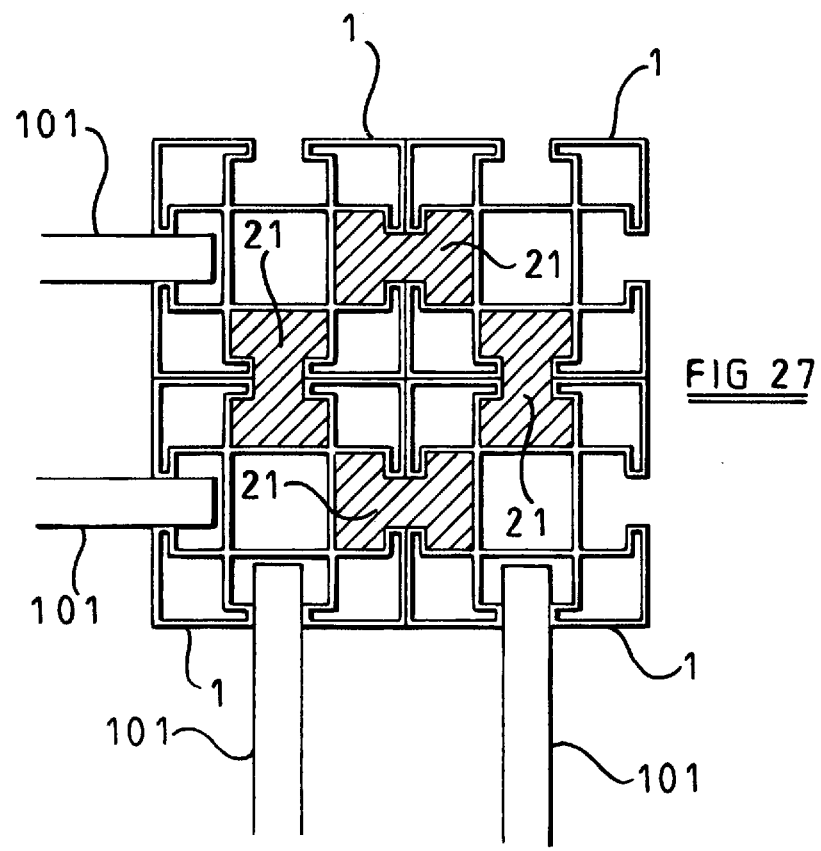
FIG. 27 shows an example of a building assembly comprising four junction members coupled together.
Figure 28:
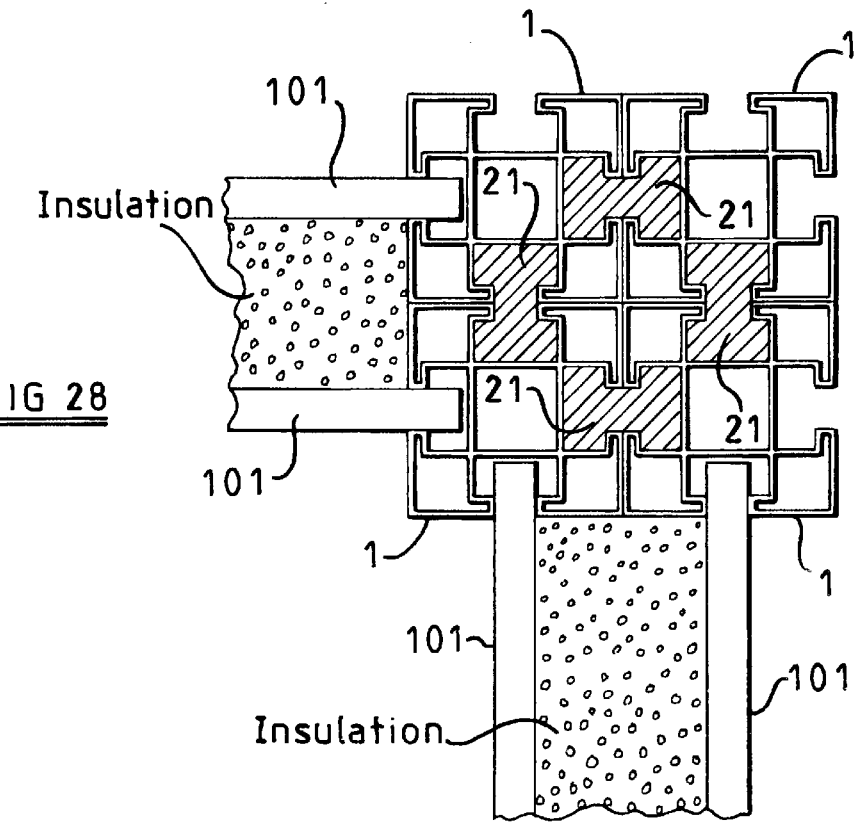
FIG. 28 shows an example of a building assembly comprising thermal insulation between barriers.
Figure 29:
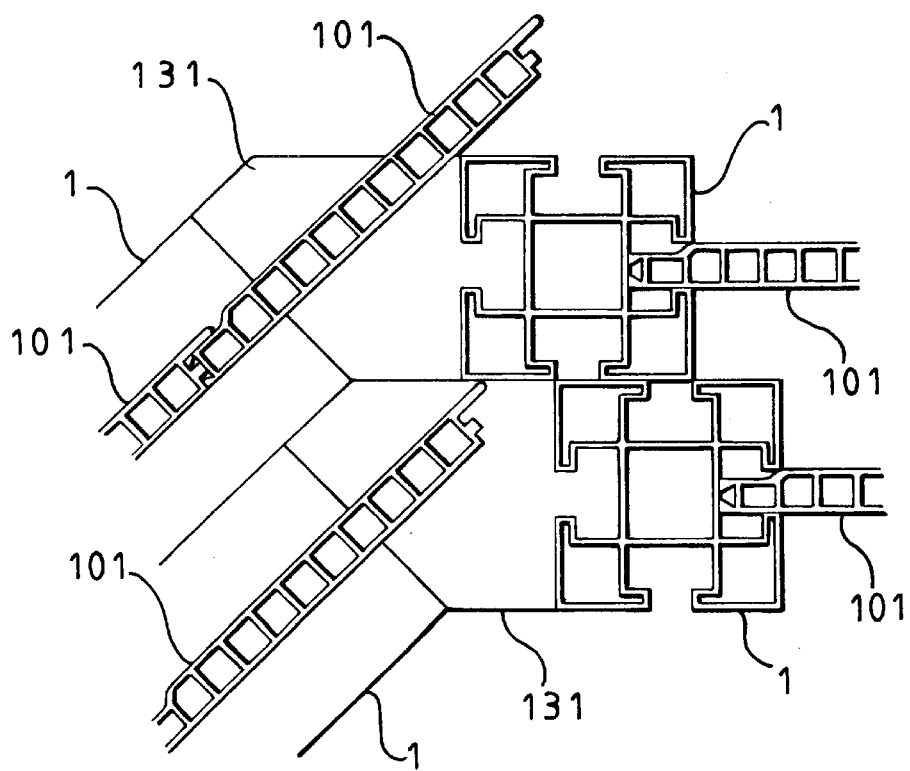
FIG. 29 shows an example of cross section of a roof and down wall.
Figure 32:
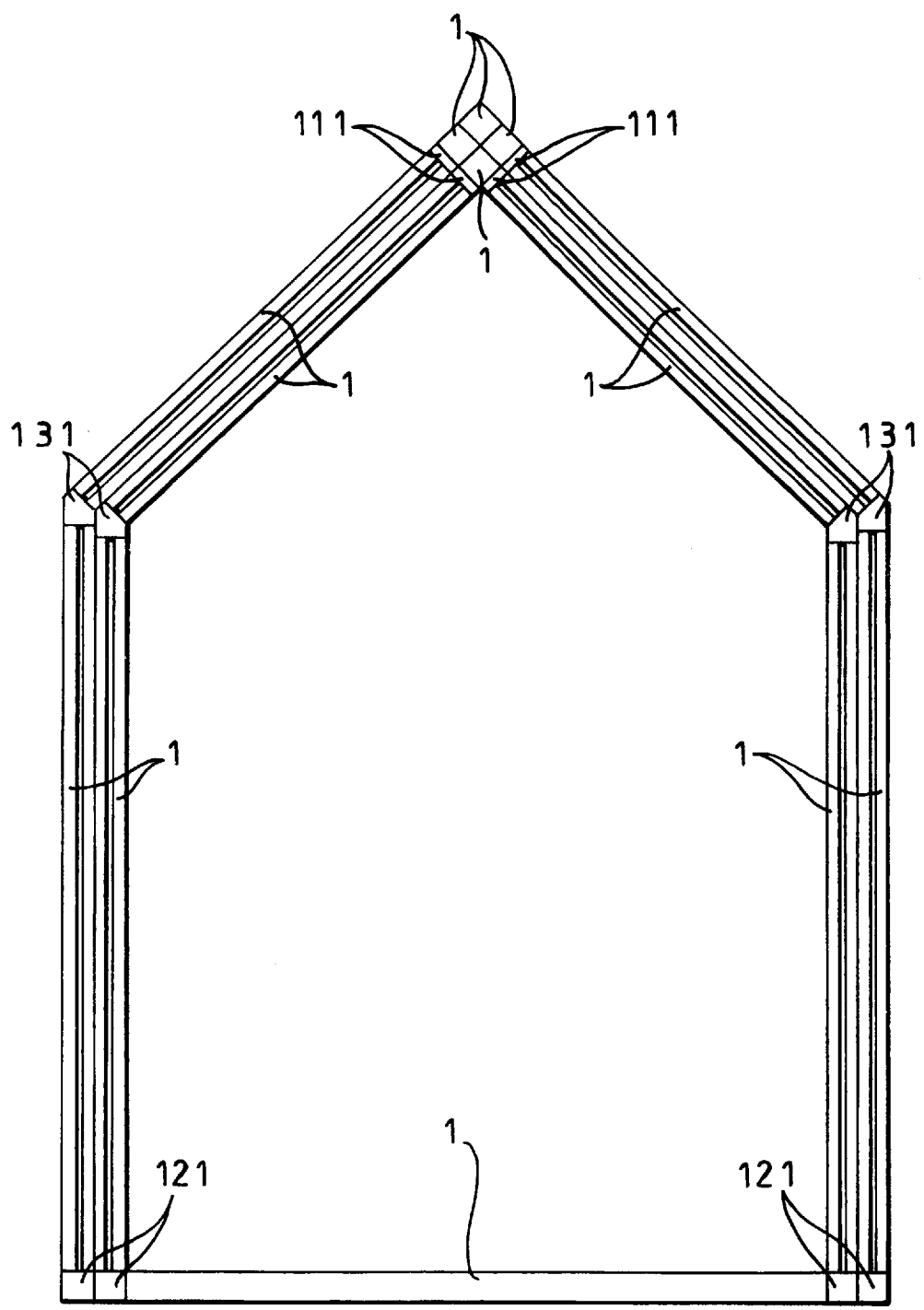
FIG. 32 shows nesting of a structure within another structure.

FIG. 26 shows an example of a building (e.g. a shed) comprising an assembly of components including junction members 1, barriers 101, and coupling members 121, 131, a doorway 171, and a window 172. The building may be assembled in any suitable manner(s) appropriate to said components, e.g. pad(s) 81 and/or spike(s) 91 may contact ground and/or be inserted in the ground so as to dispose junction member 1 upwardly.

In FIGS. 27 to 32, the reference numerals refer to components described above with the same reference numerals.

Figure 33:
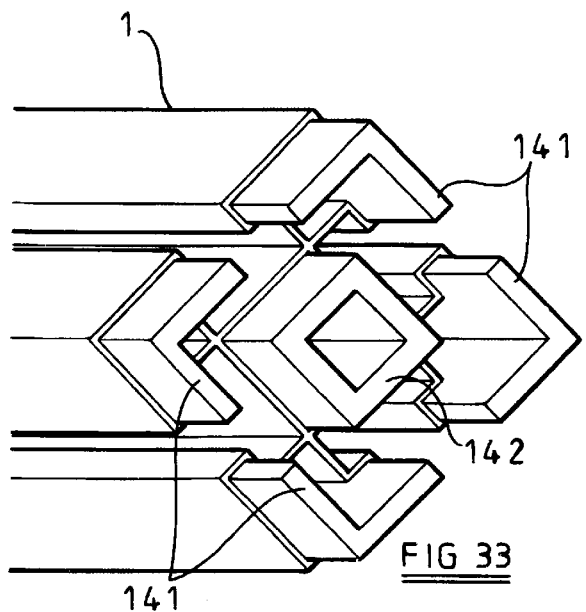
FIG. 33 to 36 show some examples of providing junction members with optional strengthening members.
Figure 34:
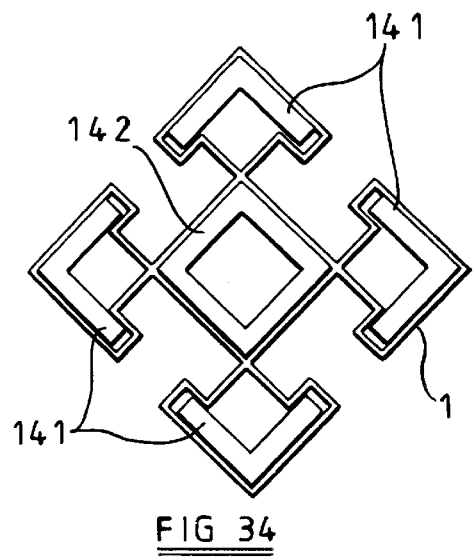

FIGS. 33 and 34 show a first example of a junction member 1 (FIG. 1) having four galvanised steel strengthening bars 141 of angle profile respectively in corner tunnels 5 and optionally protruding therefrom to be available to enter e.g. the corresponding corner tunnels 5 of a second example of junction member 1 (not shown). Central tunnel 6A of the first above mentioned junction member 1 contains a galvanised steel strengthening tube 142 of square profile optionally protruding therefrom to be available to enter the corresponding central tunnel 6A of the second above mentioned junction member 1.

Figure 35:
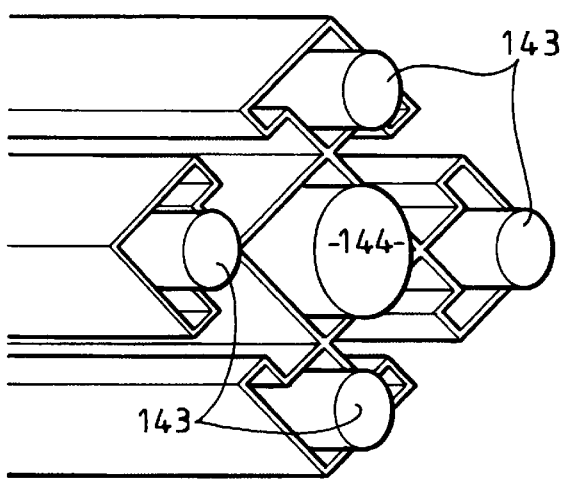
Figure 36:
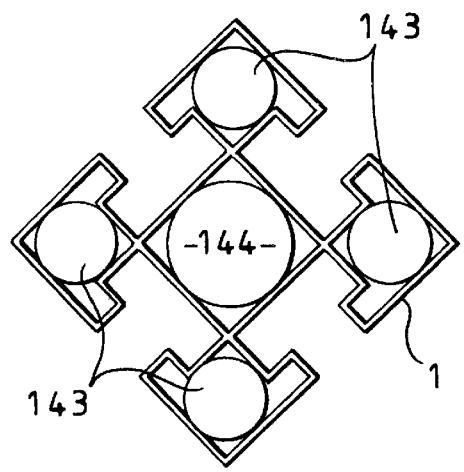

FIGS. 35,36 show a third example of a junction member 1 (FIG. 1) having four galvanised steel strengthening rods 143 of circular profile respectively in corner tunnels 5 and optionally protruding therefrom to be available to enter the corresponding corner tunnels 5 of a fourth example of junction member 1 (not shown). Central tunnel 6A of the third above mentioned junction member 1 contains a galvanised strengthening rod 144 of circular profile and greater diameter than the diameters of rods 143, optionally therefrom to be available to enter the corresponding central tunnel 6A of the fourth above mentioned junction member 1.

It will be appreciated that examples of junction member 11 (FIG. 2) may be provided with suitable shaped galvanised steel strengthening bars, rods, tubes, etc. in manners similar to FIGS. 33 to 36.

In general any suitable strengthening members may be utilised in the present invention, for example bars, rods, tubes, etc.

In general, and accordance with the present invention, any suitable assembly of any suitable structure may be provided by utilising any suitable component(s) described above with reference to any of the accompanying drawings. However, further component(s) may be utilised with the present invention even though any such further components are not shown in the drawings.

I claim:

1. A polygonal junction member, comprising:
   (a) an external form and an internal form;
   (b) said external form is polygonal in cross section and defines faces thereof, said faces defining external corners of said polygonal cross section, each of said external corners defining a tunnel, each of said external corners forms a corner box section, said corner box section having an internal corner and said external corner;
   (c) said internal form is polygonal in cross section and defines an internal box section having faces which define corners of said internal form, each of said corners of said internal form intersects with one of said internal corners of said external form, each of said corner box sections is movably connected to said internal form at said intersection to provide said corner box section with at least one dimensional degree of freedom;
   (d) adjacent external corners of said external form are spaced apart to provide a slot therebetween, said slot being a substantially T-shape, a portion of said slot being defined by one of said faces of said internal form.

2. The polygonal junction member as claimed in claim 1, wherein said external form is tetragonal and said internal form is tetragonal.

3. The polygonal junction member as claimed in claim 1, wherein said external form is hexagonal and said internal form is hexagonal.

4. The polygonal junction member as claimed in claim 1, wherein said slot extends at least a portion of a longitudinal length of said polygonal junction member.

\* \* \* \* \*